United States Patent
Valle et al.

(10) Patent No.: US 7,258,040 B2
(45) Date of Patent: Aug. 21, 2007

(54) HOLLOW CRANK ARM FOR A BICYCLE AND PROCESS FOR MANUFACTURING THE SAME

(75) Inventors: Maurizio Valle, Vicenza (IT); Paolo Pasqua, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 197 days.

(21) Appl. No.: 10/391,705

(22) Filed: Mar. 19, 2003

(65) Prior Publication Data

US 2003/0226422 A1 Dec. 11, 2003

(30) Foreign Application Priority Data

Mar. 19, 2002 (EP) .................................. 02425171

(51) Int. Cl.
*G05G 1/14* (2006.01)
(52) U.S. Cl. .................................... 74/594.1
(58) Field of Classification Search ............... 74/594.1, 74/587, 594.2, 594.3
See application file for complete search history.

(56) References Cited

U.S. PATENT DOCUMENTS

| 5,010,785 A | * | 4/1991 | Romero ..................... 74/594.1 |
| 5,623,856 A | | 4/1997 | Durham |
| 5,766,106 A | | 6/1998 | Edwards |
| 5,893,299 A | | 4/1999 | Yamanaka |
| 5,904,072 A | | 5/1999 | Yamanaka |
| 5,988,016 A | | 11/1999 | Yamanaka |
| 6,058,803 A | | 5/2000 | Yamanaka |
| 6,079,294 A | | 6/2000 | Mizobe |
| 6,195,894 B1 | * | 3/2001 | Mizobe et al. ............. 29/897.2 |
| 6,227,070 B1 | | 5/2001 | Mizobe et al. |
| 6,266,990 B1 | | 7/2001 | Shook et al. |
| 6,415,684 B1 | * | 7/2002 | Yamanaka ................. 74/594.1 |

FOREIGN PATENT DOCUMENTS

| DE | 850275 | 9/1952 |
| EP | 02425171 | 2/1997 |
| EP | 0849153 | 12/1997 |

\* cited by examiner

*Primary Examiner*—Vicky A. Johnson
(74) *Attorney, Agent, or Firm*—Volpe & Koenig PC (57) ABSTRACT

A hollow crank arm for a bicycle comprising a body of elongated shape, at the ends of which are formed, respectively, an area for connection of the bottom bracket spindle and an area for connection of the pedal. The body includes a cavity of elongated shape and two solid end portions which are the aforesaid connection areas for the bottom bracket spindle and for the pedal. The crank arm is preferably formed through a forging process.

54 Claims, 9 Drawing Sheets

Fig_4

Fig_5

Fig_6

Fig_7

Fig_8

Fig_9

Fig_10

Fig_11

Fig_18

Fig_19

Fig_20

Fig_24

Fig_25

Fig_26

HOLLOW CRANK ARM FOR A BICYCLE AND PROCESS FOR MANUFACTURING THE SAME

FIELD OF INVENTION

The present invention relates to a hollow crank arm for a bicycle and a process for its fabrication.

Crank arms for bicycles traditionally consist of a monolithic body made of metal material (typically aluminium or its alloys) provided at its ends with holes for attachment of the pedal and of the bottom bracket spindle.

Various solutions have already been proposed which have the purpose of creating a cavity inside the body of the crank arm in order to reduce its weight.

BACKGROUND

The Japanese document No. 5116670 describes a process for forming an inner cavity in the solid body of a crank arm by extrusion. According to this proposal, the cavity extends up to one end of the crank arm. Consequently, in order to obtain the threaded hole for fixing of the pedal it is necessary to provide an insert fixed in an end area of the crank arm. This solution presents structural strength problems in so far as it gives rise to a basically tubular structure opened at one end. This presents poor resistance to torsional and bending stresses, in particular owing to the fact that the point of application of a load, represented by the area of connection to the pedal, is provided in a hollow part. The U.S. Pat. No. 6,058,803 describes a process for producing a hollow crank arm by casting, in which a sand core is positioned in a die and the molten metal is poured into the die and solidified in order to form a crank arm body with an elongated cavity having a blind bottom and an end that opens to the outside of the hole which is provided for fixing the pedal. Also this solution presents strength problems because the cavity opens into the hole for connection of the pedal and thus weakens that area.

SUMMARY

The purpose of the present invention is to provide a hallow crank arm for a bicycle and a process for its fabrication which will overcome the problems of the prior art.

The invention provides a forged hollow crank arm for a bicycle comprising a first end area for connection to a bottom bracket spindle, a second end area for connection of a pedal and an intermediate area having a defined longitudinal cavity that extends between the ends along a longitudinal axis with an opening that faces to the outside of the crank arm and is offset with respect to the longitudinal axis.

BRIEF DESCRIPTION OF THE DRAWINGS

The characteristics and advantages of the present invention will emerge clearly in the course of the ensuing detailed description with reference to the annexed drawings, in which.

DETAILED DESCRIPTION OF THE PREFERRED EMBODIMENTS

Figure 1:
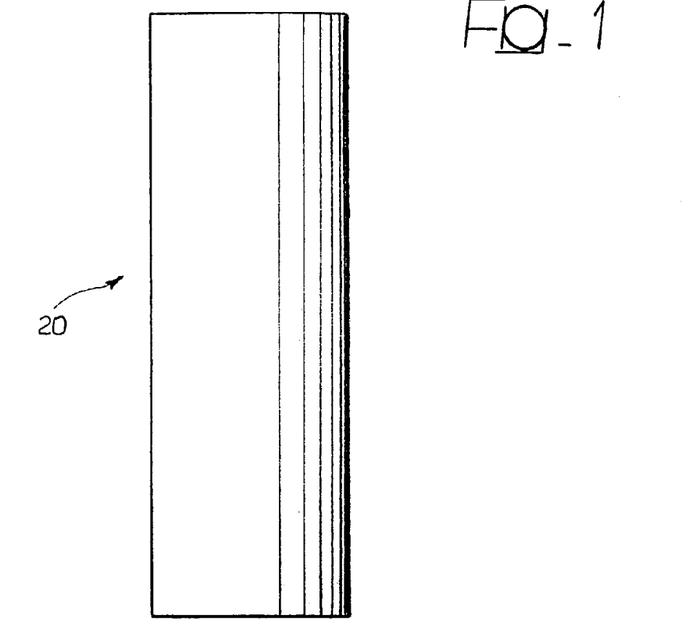
FIGS. 1 and 2 illustrate a billet of metal material designed to undergo a series of operations of plastic deformation to obtain a crank arm according to the present invention.
Figure 2:
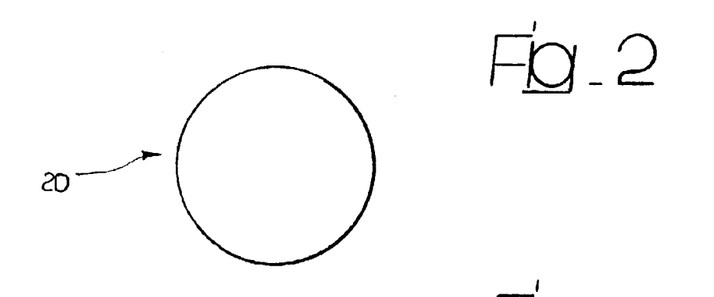
Figure 3:
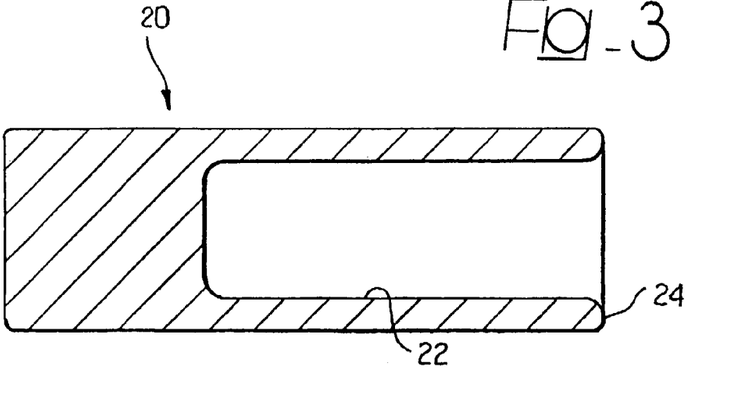
FIG. 3 illustrates the billet of FIGS. 1 and 2 at the end of a first drawing step.
Figure 4:
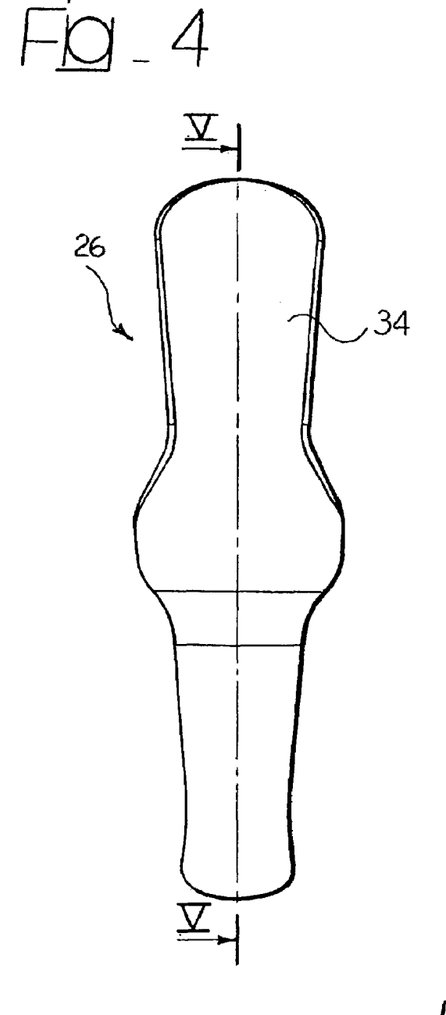
FIGS. 4, 5 and 6 are, respectively, a front view, a sectional view, and a top-plan view of a preform or intermediate form of a pedal at the end of a second drawing step.
Figure 5:
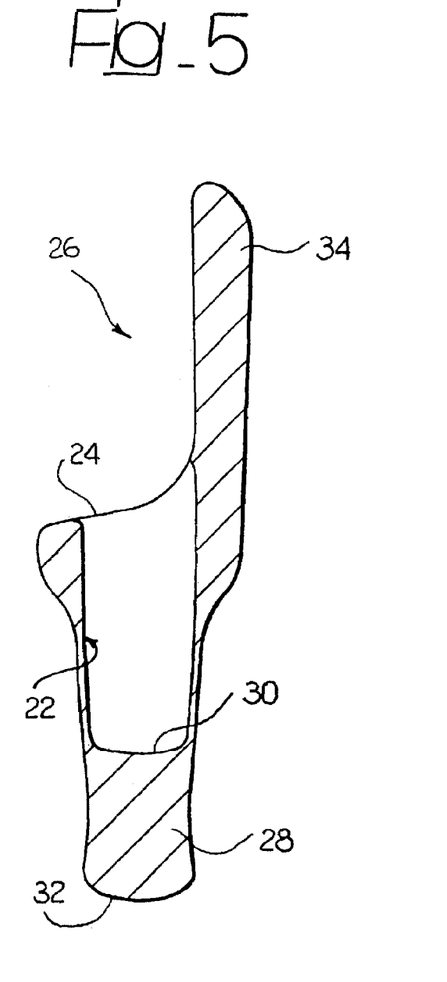
Figure 6:
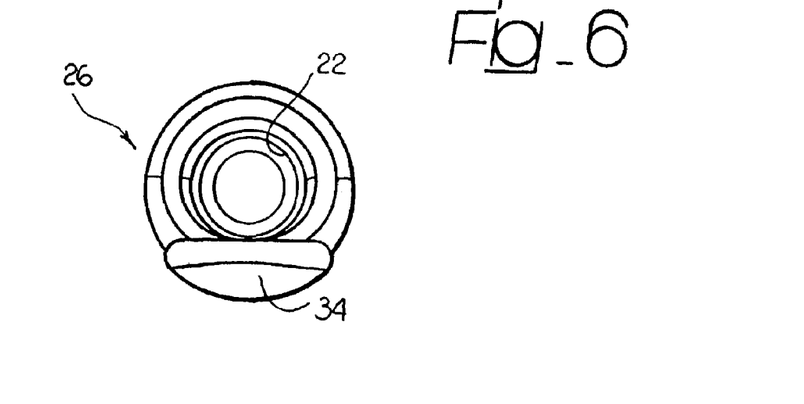

Designated by 20 in FIGS. 1 and 2 is a billet made of light metal material such as aluminium, its alloys, or similar light alloys, which constitutes the starting element for obtaining a hollow crank arm according to the present invention. The billet 20 preferably has the shape of a solid cylinder with a circular cross section, preferably obtained starting from a cylindrical bar by making a cut in the direction orthogonal to the longitudinal axis of the bar. The billet 20 undergoes a first operation of hot plastic deformation, preferably a forging in a press, which draws the billet and results in the formation of a cylindrical cavity having a blind end or bottom, designated by 22 in FIG. 3. The cylindrical cavity opens out onto an end 24 of the billet. FIG. 3 illustrates the billet 20 at the end of the first drawing step. This billet is subjected to a second drawing step, at the end of which a preform or intermediate form of the crank arm 26 is obtained, with basically the shape illustrated in FIGS. 4, 5 and 6. The crank arm preform 26 has a cavity with a blind bottom 22 having an open end 24. A solid portion 28 is set between the bottom 30 of the cavity 22 and a first end 32 of the crank arm preform 26. A projecting portion 34 extends laterally with respect to the cavity 22 and projects beyond the open end 24 of the cavity 22 on the opposite side with respect to the cavity 22.

Figure 7:
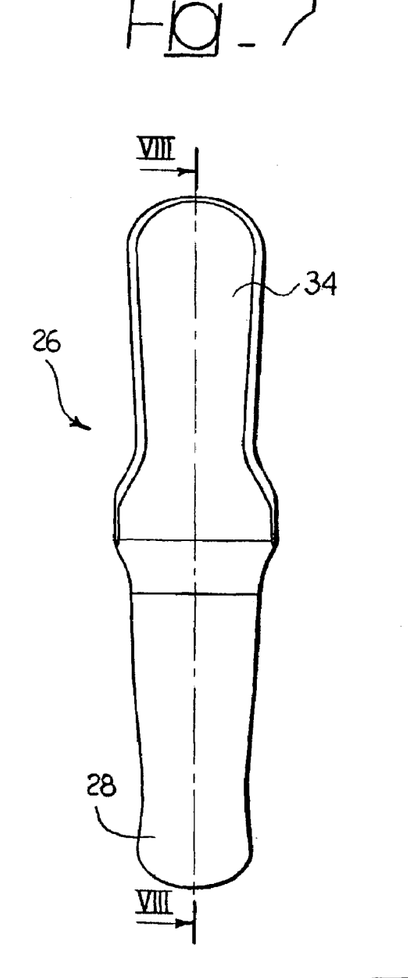
FIGS. 7, 8 and 9 are, respectively, a front view, a sectional view, and a top-plan view of a preform or intermediate form of a pedal at the end of a third drawing step.
Figure 8:
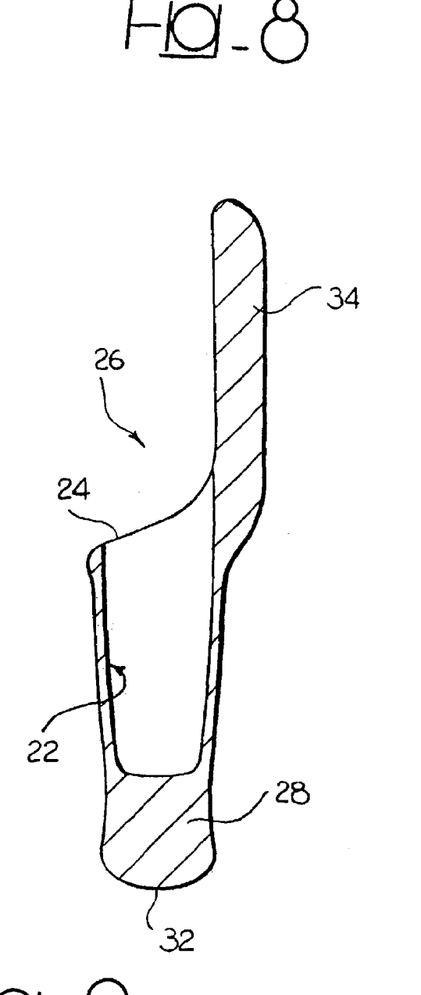
Figure 9:
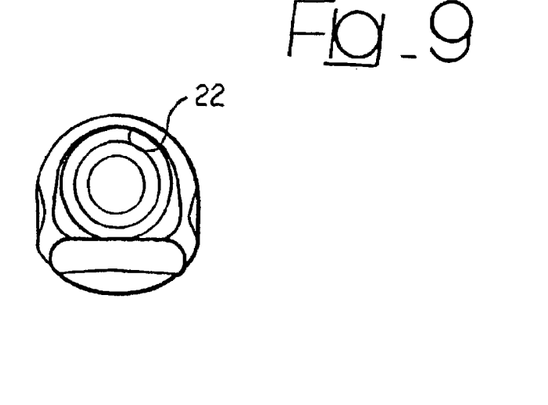

The crank arm preform 26 undergoes a third forging step, at the end of which the semi-finished product illustrated in FIGS. 7, 8 and 9 is obtained. This semi-finished product has a projecting portion 34 that extends laterally with respect to the cavity 22 and is set on the opposite side of said cavity. This drawing step elongates the cavity 22 and renders the thickness of the wall surrounding the cavity 22 uniform.

Figure 10:
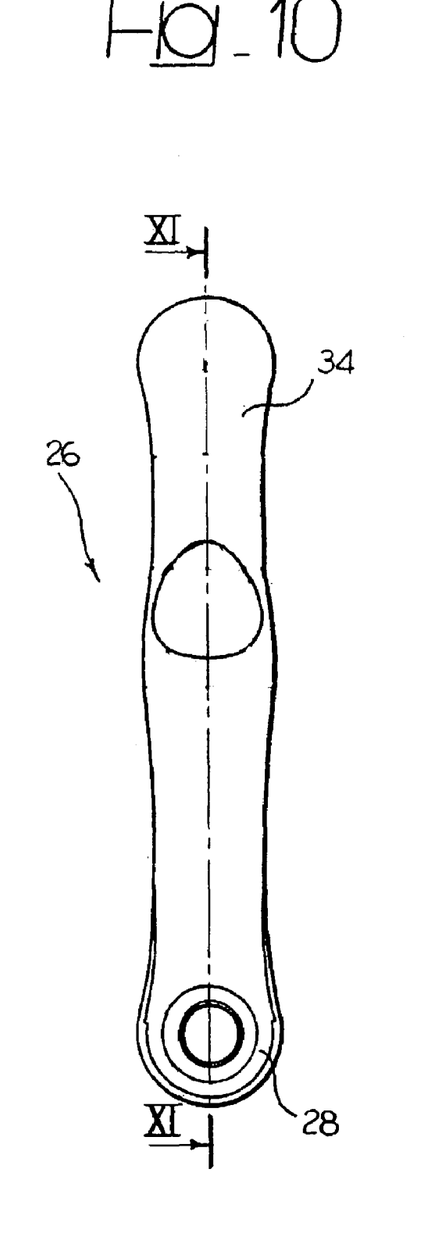
FIGS. 10 and 11 are, respectively, an elevation and a sectional view of a preform or intermediate form of a pedal at the end of a fourth drawing step.
Figure 11:
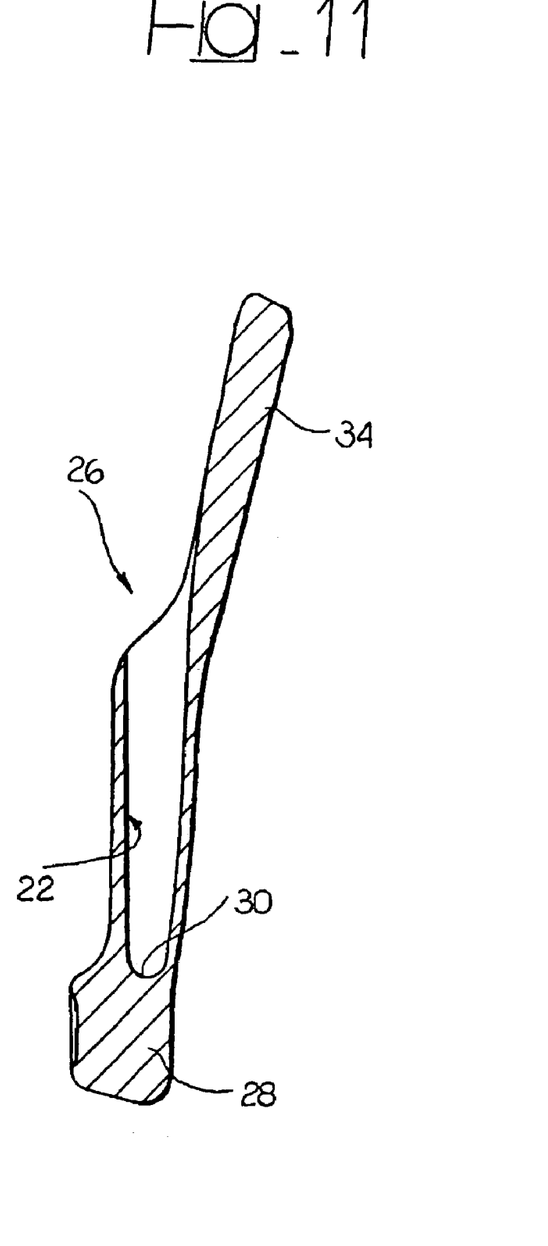

By means of a further forging step the semi-finished product 26 assumes the shape illustrated in FIGS. 10 and 11. In this further forging step, the cavity 22 is elongated and restricted, whilst the solid portion 28 is shaped so as to form an area of connection to the bottom bracket spindle. The projecting portion 34 is always set laterally with respect to the cavity 22 and, at the end of this fourth forging step, is slightly inclined outwards. It may be noted that in all the foregoing forging steps the projecting portion 34 is positioned in relation to the cavity 22 in such a way as not to obstruct the insertion and extraction of a drawing punch, as will be known to those skilled in the art, that is inserted inside the cavity 22 during each forging step. That is, the cavity 22 has a longitudinal axis that extends between portions 28 and 34 and the centre of the opening of the opening 24 is on the longitudinal axis.

Figure 12:
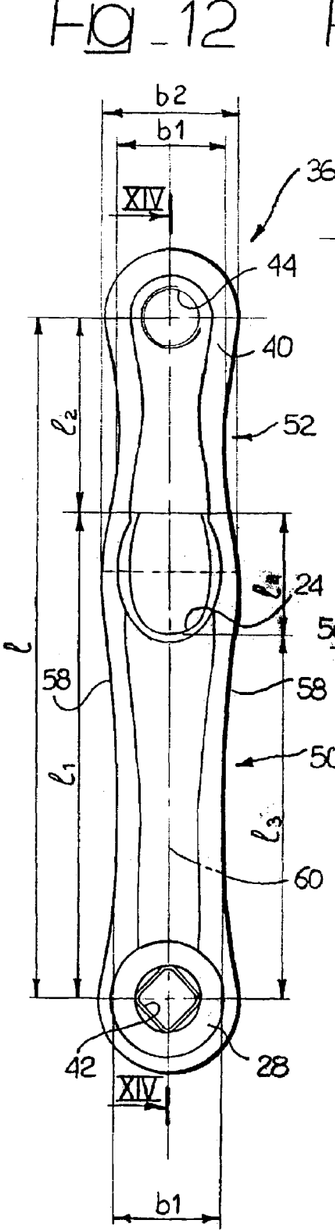
FIGS. 12, 13 and 14 are, respectively, a front elevation, a side elevation, and a sectional view of a finished crank according to a first embodiment of the present invention.
Figures 13, 14:
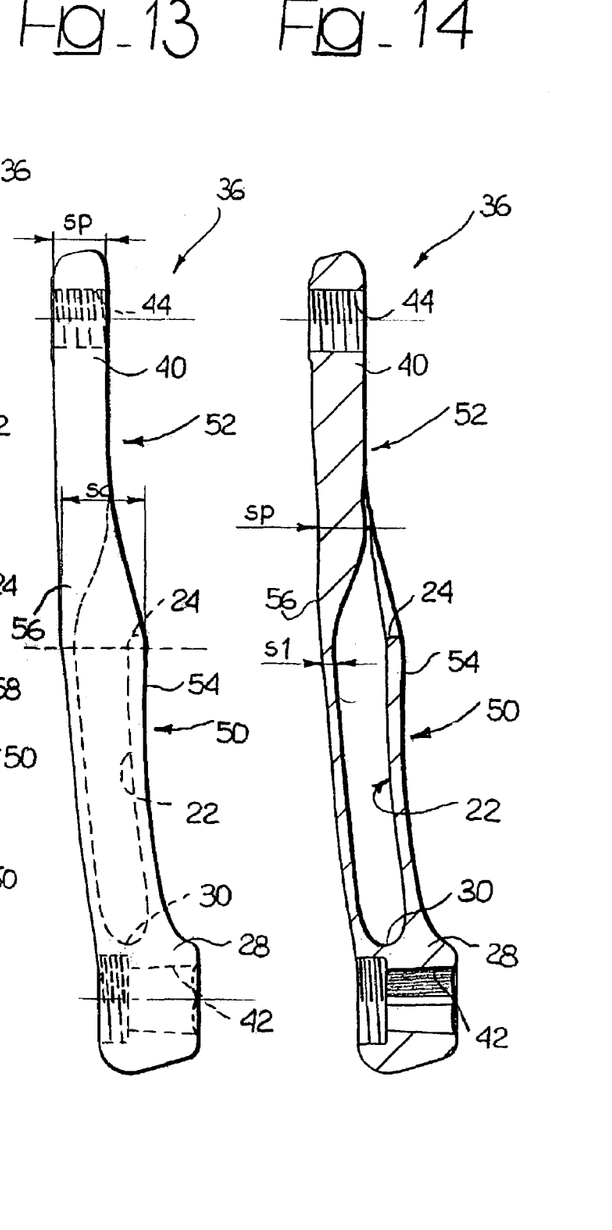

The semi-finished product 26 then undergoes a fifth and final fabrication step of hot plastic deformation, which results in a crank arm body 36 having the final shape illustrated in FIGS. 12, 13 and 14. As a result of this deformation, the opening 24 of the cavity 22 is biased toward the side 54 and opening 24 becomes offset with respect to the longitudinal axis of the cavity 22.

The finished crank arm body 36 comprises a solid area 28 for connection to the bottom bracket spindle and a solid area 40 for connection of the pedal, in which respective holes 42, 44 are formed by machining away material. The hole 44 for connection of the pedal 44 is usually threaded, whereas the hole 42 for connection to the bottom bracket spindle has a shape, for example square, designed to transmit torque when coupled with a complementary part of the bottom bracket spindle. The crank arm body has a hollow section 50 and a solid section 52 which extend between the aforesaid areas 28 and 40 for connection to the bottom bracket spindle and connection of the pedal. The solid section 52 includes the solid area 40 for connection of the pedal. The hollow section is adjacent to the solid area 28 for connection to the bottom bracket spindle. In said hollow section, the walls are thin and the cavity has a predominant dimension with respect to the thickness of the walls.

Figures 16, 17:
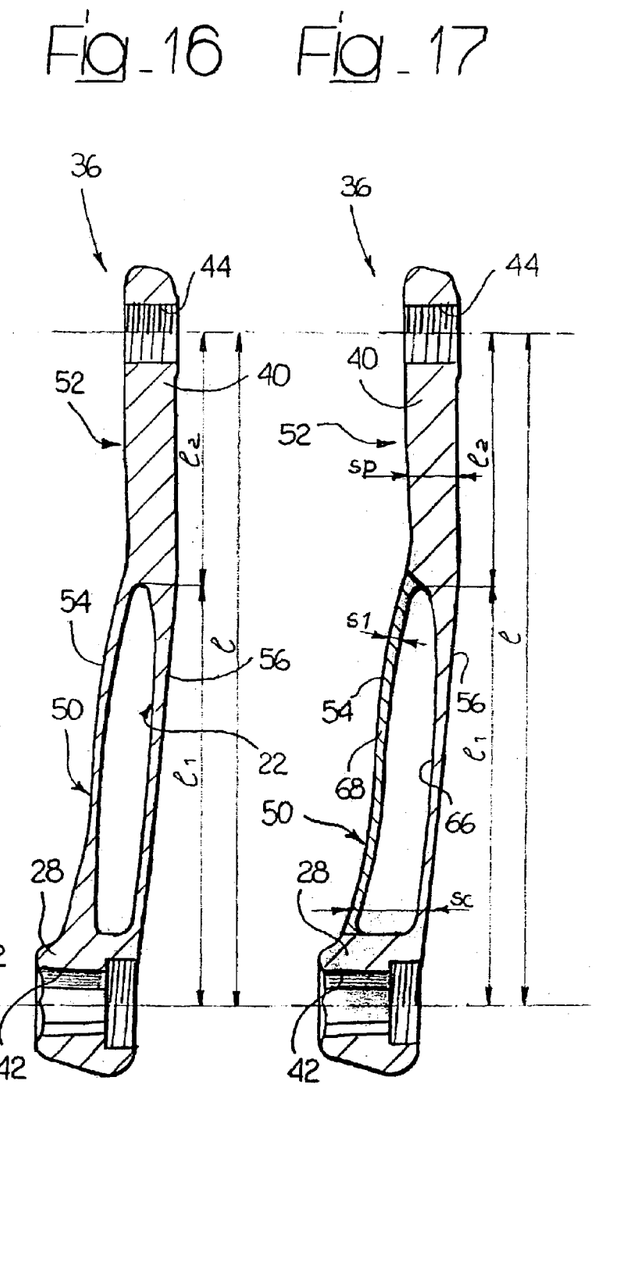
FIGS. 16 and 17 are cross sections illustrating two additional embodiments of the present invention.
Figure 18:
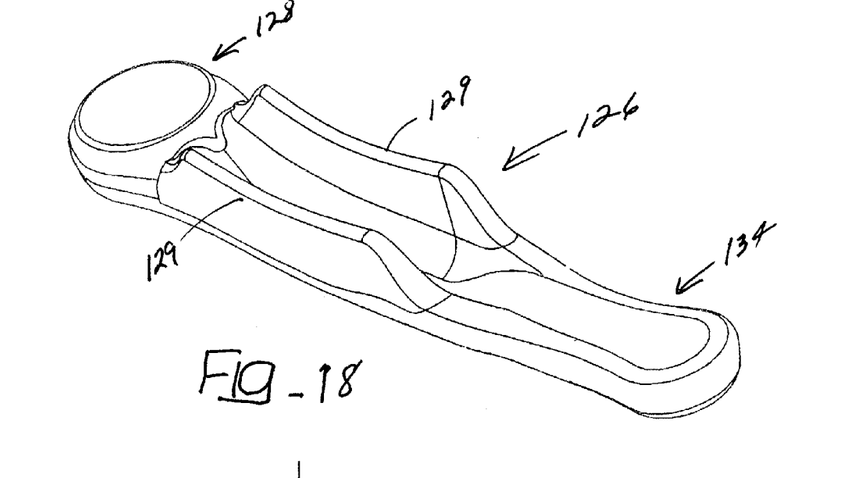
FIGS. 18 to 23 illustrate another embodiment of the invention which is formed by folding over flaps or extensions to form an internal cavity.
Figure 19:
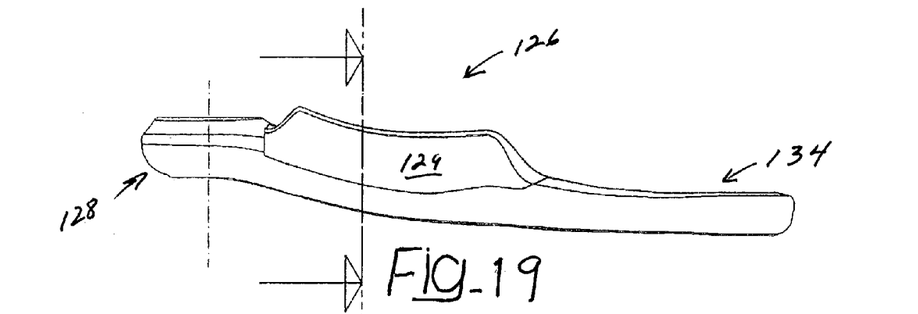
Figure 20:
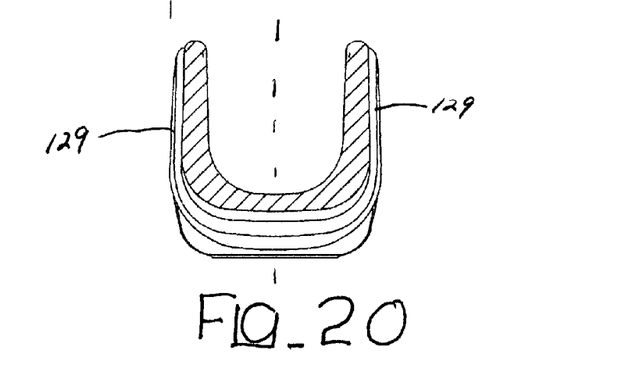
Figure 21:
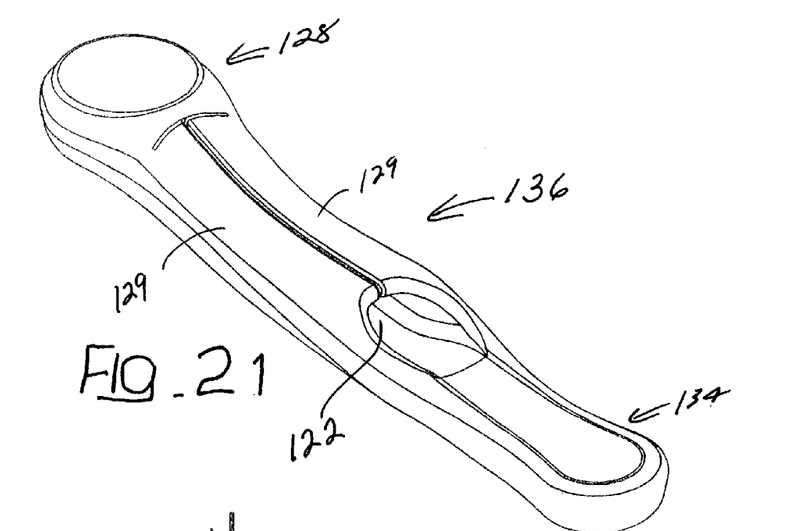
Figure 22:
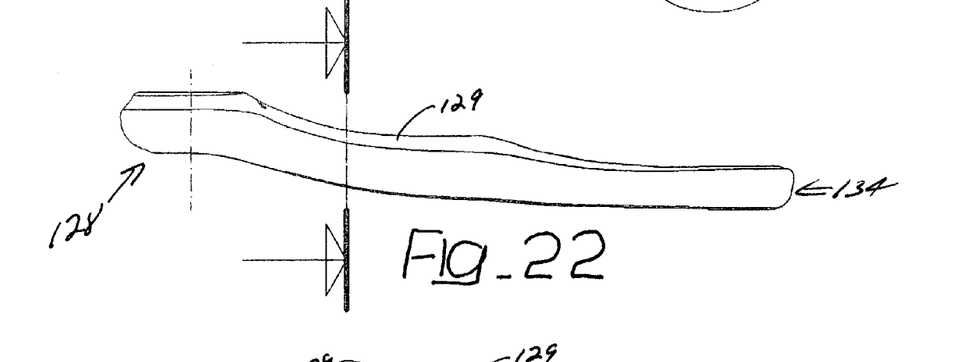
Figure 23:
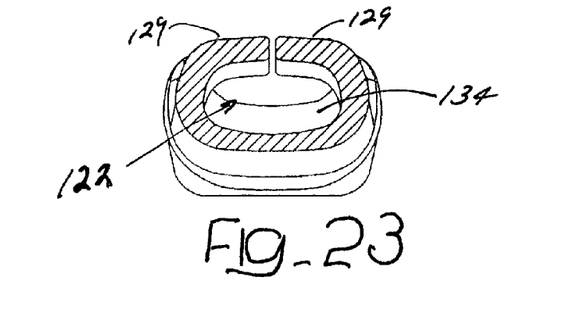

During the last formation step, the projecting portion 34 is bent and shaped so that the hollow section 50 and the solid section 52 are substantially aligned on the longitudinal axis 60 of the crank arm body. Alternatively, the solid section 50 may be slightly inclined towards the inner side of the crank arm, as illustrated in the variants of FIGS. 16 and 17 in order to exploit in an optimal way the space available when the crank arm is mounted on a bicycle. In this way, in fact, a shorter bottom bracket spindle can be made, which leads to a better transmission of motion.

With respect to the forging process the temperatures can range between 260 and 480 degrees Celsius. For the aluminium alloy of the present embodiments, temperatures between 390 and 400 degrees Celsius render the metal plastically deformable in all steps. As will be recognized by those skilled in the art, the actual temperatures and formation pressures will depend on the selected material, tooling and equipment used in the process.

Again with reference to FIGS. 12, 13 and 14, the crank arm body 36 has a wide inner side 54, a wide outer side 56 and two narrow sides 58. The hollow section 50 has a cavity 22 that communicates with the outside through the opening 24 located on one of the aforesaid sides in an area comprised between the aforesaid areas 28, 40 for connection to the bottom bracket spindle and for connection with the pedal. In the embodiment illustrated in the figures, the opening 24 is located on the wide inner side 54.

The cavity 22 has an elongated shape with an axis that substantially coincides with the longitudinal axis 60 of the crank arm body. From the point of view of the structural strength of the crank arm, it is particularly important that the areas for connection of the bottom bracket spindle and of the pedal should be made in solid areas that do not communicate with the cavity 22. This provides a greater structural strength in the connection areas. The cavity 22 is substantially closed, except for the opening 24, and this provides high stiffness and high resistance to torsional and flexural stresses to be obtained.

The opening 24 may be closed, to prevent any penetration of dust, water or dirt into the cavity 22, with a closing element that need not make any contribution to the structural strength of the crank arm.

Figure 15:
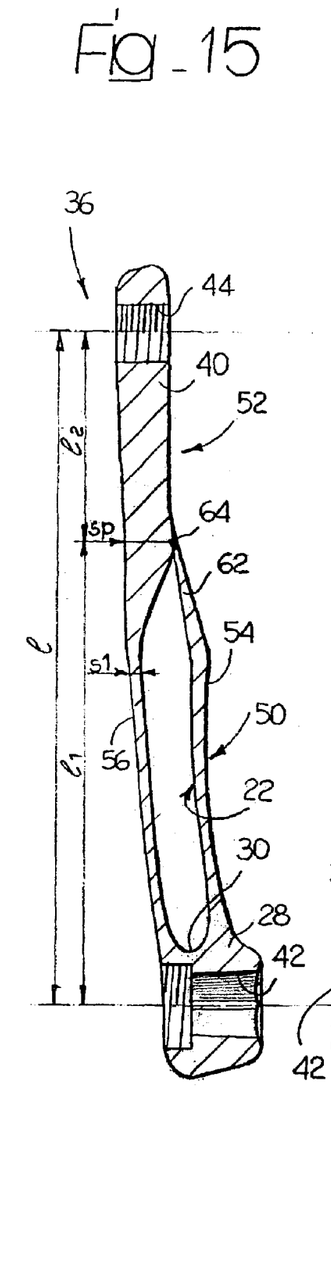
FIG. 15 is a sectional view illustrating another embodiment of the present invention.

If desired the opening 24 may be closed with the purpose of improving the structural strength of the crank arm. A way of so closing the opening 24 is illustrated in FIG. 15 and consists in forming an integral flap 62 that is closed and fixed against the open edge of the opening 24. Fixing is performed in the area indicated by 64, for instance by welding or bonding. Closing the cavity 22 is believed to be advantageous from the standpoint of the structural strength, since it is known that a closed structure has a higher moment of inertia and is able to distribute the stresses more evenly.

The crank arm according to the present invention can be produced with processes different from the one described previously. For example, FIG. 16 illustrates a crank arm with a cavity 22 that is completely closed, the said crank arm being obtainable with a process of casting of molten metal material, such as aluminium or its alloys or titanium, into a die. To form the closed cavity 22 the use of a core (not illustrated) is envisaged, the said core having a shape corresponding to the shape of the cavity 22. The core may consist of a vitreous material with a density and specific weight smaller than that of the material constituting the crank arm body, and may remain englobed in the crank arm body. Alternatively, the core could be made from a granular material which is extracted at the end of solidification of the molten material, for example through an opening that can be closed, as indicated previously.

FIG. 17 illustrates a further alternative for producing a crank arm according to the invention. This consists in forming a crank arm body with an open lowered area 66 that is closed by a closing element 68, which covers the entire lowered area 66 in order to form a closed cavity. In the above variant the crank arm body 36 may be obtained by plastic deformation, casting or by machining-away of material, and the closing element 68 may be fixed by welding or bonding.

A crank arm having the shape illustrated in FIGS. 12 to 17 may be obtained by crosslinking, in a die, of a structural-fiber-based fabric embedded in a matrix of plastic material. The fibres may be chosen in the group comprising carbon fibres, glass fibres, aramidic fibres, boron fibres, ceramic fibres, or any combination thereof. In this case, the cavity 22 may be formed by providing an expandable core on which the fabric englobed in a non-crosslinked matrix is wound. During crosslinking of the material, the core applies a forming pressure on the inner surfaces of the cavity and is extracted from the crank arm body at the end of crosslinking of the material. The expandable core may consist of a thermally dilatable material such as Teflon or the like. Alternatively, the cavity may be formed by providing an inflatable element for forming the inner surfaces of the cavity.

With reference to FIGS. 12 to 17, the crank arm according to the present invention, irrespective of the process and of the material used for its fabrication, is characterized by certain dimensional ratios that enable optimal results to be obtained in terms of mechanical strength and lightness. In the figures, the letter l indicates the useful length of the crank arm, defined as the distance between the centres of the holes 42 and 44; the letter $l_1$ indicates the distance between the outer end of the opening 24 and the centre of the hole 42; $l_2$ indicates the distance between the outer end of the opening 24 and the hole 44; $l_3$ indicates the distance between the inner edge of the opening 24 and the centre of the hole 42; and $l_4$ indicates the distance between the outer edge and the inner edge of the opening 24, all these distances being measured in the direction of the longitudinal axis 60 of the crank arm. According to the present invention, the ratio $l_2/l$ (which expresses the length of the solid section in proportion to the useful length of the crank arm) is comprised between 0.2 and 0.5, and preferably between 0.3 and 0.4; the ratio $l_3/l$ (i.e. the ratio between the length in the "closed" hollow section and the useful length of the crank arm) is comprised between 0.3 and 0.8, and preferably between 0.5 and 0.7; the ratio $l_4/l$ (i.e. the length of the opening in proportion to the useful length) is comprised between 0.1 and 0.25, and preferably between 0.15 and 0.22; and the ratio $l_1/l$ (i.e. the ratio between the overall length of the hollow section and the useful length of the crank arm) is comprised between 0.3 and 0.8, and preferably between 0.6 and 0.7.

As is illustrated in FIG. 12, according to a preferred aspect of the present invention, the areas 28 and 40 for connection to the bottom bracket spindle and for connection of the pedal, and the area bearing the opening 24 have a width, designated by $b_2$, greater than the width of the hollow section 50 and of the solid section 52 designated by $b_1$. In particular, the ratio $b_2/b_1$ is comprised between 1.1 and 1.5, and preferably between 1.2 and 1.3.

A further particularly important ratio of dimensions is that of the thicknesses, $s_c$ (thickness of the hollow section 50), $s_p$ (thickness of the solid section 52) and $s_l$ (thickness of the wall surrounding the cavity 22), indicated in FIGS. 13, 14 and 17. According to a preferred aspect of the present invention, the ratio $s_c/s_p$ is comprised between 1.2 and 3.0, and preferably between 1.5 and 1.7, whilst the ratio $s_l/s_p$ is comprised between 0.1 and 0.3, and is preferably 0.2. In addition, the variation in the wall thickness from $s_l$ to $s_p$ must preferably be gradual with smooth curves without any sharp edges, in order to prevent stress concentrations from forming at the opening 24, this being one of the most critical areas from the point of view of the risk of failure since it has an open section.

The foregoing description refers to a process for the production of what is commonly recognized as a left-hand crank arm. It will understood that the process applies equally to a right-hand crank arm.

Figure 24:
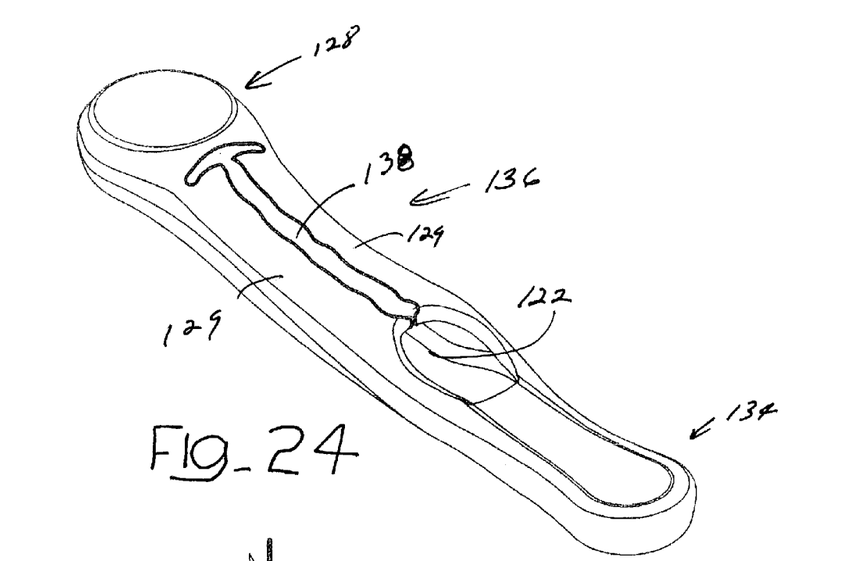
FIGS. 24 to 26 Illustrated the embodiment of FIGS. 18 to 23 with the further addition of a weld bead along the folds forming the internal cavity.
Figure 25:
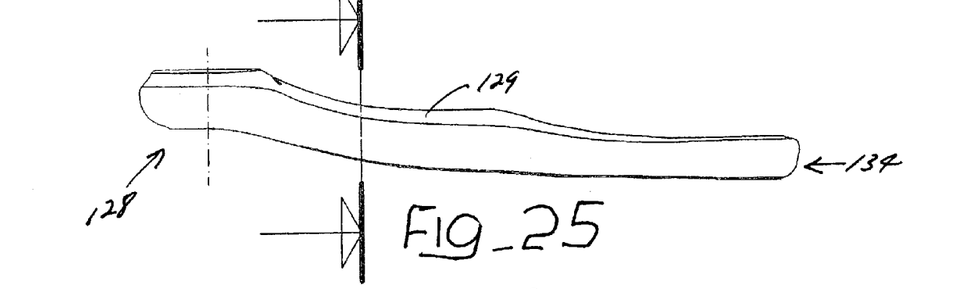
Figure 26:
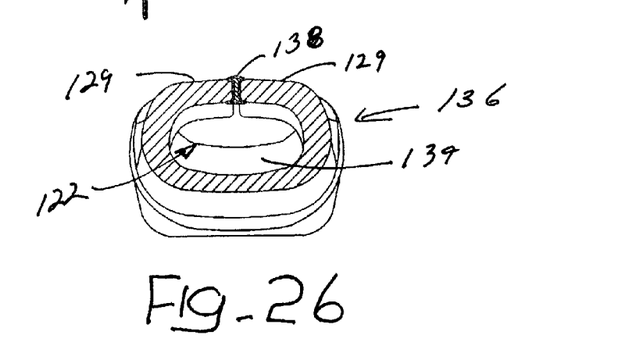

The crank arm according to the present invention and the process for its fabrication may be varied. For example, the cavity 22 could open onto the outside in two different points, for instance on both of the wide sides, 54 and 56, of the crank arm. Furthermore, the crank arm 136 may also be obtained from a U-shaped forging as illustrated in FIGS. 18-26. In the initial forging 126 for the crank arm 136, the intermediate portion between the end portions 128 and 134 is formed with the flaps or extensions 129 spaced on either side of the longitudinal axis through the crank arm perform 126. Subsequently, the flaps 129 are formed over toward the longitudinal axis and produce the cavity 122 in the crank arm 136, see FIGS. 21-23. Preferably, the resulting structure 136 is then closed or fixed by welding bead 138 along the edges of the formed over flaps or extensions 129 as illustrated in FIGS. 24-26. This formation technique yields a crank arm having the features of the previously described embodiments.

What is claimed is:

1. A hollow crank arm for a bicycle comprising an end area for connection to the bottom bracket spindle, an end area for connection of the pedal, said areas spaced apart from one another generally along a longitudinal axis of the crank, a middle portion located between the end areas comprising, at different positons along the longitudinal axis, an open cavity and a solid portion, wherein said cavity has an opening which opens out onto an outside of the crank arm in an area comprised between the area of connection to the bottom bracket spindle and the area for connection of the pedal;

wherein the ratio between a length of the solid portion and a useful length of the crank arm is equal to or greater than 0.2; and wherein the crank arm has a first predetermined thickness in a position corresponding to said solid portion, and a second predetermined thickness in a position corresponding to said hollow portion.

2. A crank arm according to claim 1, comprising an outer wide side, an inner wide side, and a pair of narrow sides, characterized in that said opening opens out onto one of the aforesaid sides.

3. A crank arm according to claim 2, characterized in that said opening opens out onto one of the aforesaid wide sides.

4. A crank arm according to claim 3, characterized in that said opening opens out onto the aforesaid inner wide side.

5. A crank arm according to claim 1, characterized in that said opening opens out onto one area closer to the area for connection of the pedal and further away from the area for connection to the bottom bracket spindle.

6. A crank arm according to claim 1, which has a predetermined useful length between the centres of the areas for connection of the bottom bracket spindle and for connection of the pedal, characterized in that it comprises a solid portion having a predetermined length.

7. A crank arm according to claim 1, which has a predetermined useful length between the centres of the areas for connection of the bottom bracket spindle and for connection of the pedal, characterized in that it comprises the hollow portion having a closed section and a predetermined length.

8. A crank arm according to claim 7, characterized in that the ratio between said length of the hollow portion with closed section and said useful length of the crank arm is equal to or smaller than 0.8.

9. A crank arm according to claim 7, characterized in that the ratio between said length of the hollow portion with closed section and said useful length of the crank arm is comprised between 0.5 and 0.7.

10. A crank arm according to claim 1, which has a predetermined useful length between the centres of the areas for connection of the bottom bracket spindle and for connection of the pedal and a predetermined length of said opening, characterized in that the ratio between said length of said opening and said useful length of the crank arm is equal to or greater than 0.1.

11. A crank arm according to claim 1, which has a predetermined useful length between the centres of the areas for connection of the bottom bracket spindle and for connection of the pedal and a predetermined length of said opening, characterized in that the ratio between said length of said opening and said useful length of the crank arm is equal to or smaller than 0.25.

12. A crank arm according to claim 1, which has a predetermined useful length between the centres of the areas for connection of the bottom bracket spindle and for connection of the pedal and a predetermined length of said opening, characterized in that the ratio between said length of said opening and said useful length of the crank arm is comprised between 0.15 and 0.22.

13. A crank arm according to claim 1, which has a predetermined minimum width characterized in that it has, in a position corresponding to the aforesaid opening, a width oversized with respect to said minimum width.

14. A crank arm according to claim 13, characterized in that the ratio between said oversized width and said minimum width is equal to or greater than 1.1.

15. A crank arm according to claim 13, characterized in that the ratio between said oversized width and said minimum width is equal to or smaller than 1.5.

16. A crank arm according to claim 13, characterized in that the ratio between said oversized width and said minimum width is comprised between 1.2 and 1.3.

17. A crank arm according to claim 1, which has a predetermined minimum width characterized in that, in a position corresponding to at least one of said areas for connection to the bottom bracket spindle and for connection of the pedal, it has a width oversized with respect to said minimum width.

18. A crank arm according to claim 1, characterized in that said cavity has walls having a predetermined thickness and in that the ratio between said wall thickness and the thickness of said hollow part is equal to or greater than 0.1.

19. A crank arm according to claim 18, characterized in that the ratio between said wall thickness and said thickness of said hollow part is equal to or smaller than 0.3.

20. A crank arm according to claim 18, characterized in that the ratio between said wall thickness and said thickness of said hollow part is substantially equal to 0.2.

21. A crank arm according to claim 1, characterized in that, in a position corresponding to the aforesaid opening, the thickness increases progressively from the aforesaid wall thickness to said thickness of said solid area.

22. A crank arm according to claim 1, characterized in that it has external and internal surfaces with smooth curvatures.

23. A crank arm according to claim 1, characterized in that it is made of a material chosen in the group consisting of: aluminium and its alloys, titanium, and structural-fiber-based fabric embedded in a matrix of plastic material, in which said fibres are chosen from the group consisting of: carbon fibres, glass fibres, aramidic fibres, boron fibres, ceramic fibres, and any combination thereof.

24. A hollow crank arm for a bicycle comprising an end area for connection to the bottom bracket spindle, an end area for connection of the pedal, a middle portion located between the end areas comprising an open cavity adjacent to a solid portion along a longitudinal axis of the crank arm, wherein said cavity has an opening which opens out onto an outside of the crank arm in an area comprised between the area of connection to the bottom bracket spindle and the area for connection of the pedal;
wherein the crank arm has a predetermined minimum width that has, in a position corresponding to the opening, a width oversized with respect to said minimum width; and
wherein said open cavity has a second thickness that is greater than said solid portion first thickness.

25. A crank arm according to claim 24, characterized in that the ratio between said first thickness and said second thickness is equal to or greater than 1.2.

26. A crank arm according to claim 24, characterized in that the ratio between said first thickness and said second thickness is equal to or smaller than 3.0.

27. A crank arm according to claim 24, characterized in that the ratio between said first thickness and said second thickness is comprised between 1.5 and 1.6.

28. A crank arm for a bicycle comprising an elongated body at the ends of which are formed, respectively, an area for connection to the bottom bracket spindle and an area for connection of the pedal, characterized in that the crank arm comprises between the aforesaid end areas a portion with a hollow cross section in communication with an opening located between the areas for connection and a portion with a solid cross section;
wherein the crank arm has a first thickness at said portion with hollow cross section and a second thickness at said portion with solid cross section.

29. A crank arm according to claim 28, characterized in that the aforesaid portion with hollow cross section is adjacent to the aforesaid area for connection to the bottom bracket spindle.

30. A crank arm according to claim 28, characterized in that the aforesaid portion with solid cross section comprises the aforesaid area for connection to the pedal.

31. A crank arm according to claim 28, characterized in that, in the aforesaid portion with hollow cross section, the cavity extends for a predominant part of the section of the crank arm body.

32. A crank arm according to claim 28, characterized in that, in the condition where it is installed on a bicycle, the aforesaid portion with hollow cross section projects towards the frame of the bicycle more than does the portion with solid cross section.

33. A crank arm according to claim 28, characterized in that the aforesaid portion with hollow cross section is surrounded by a thin wall.

34. A crank arm according to claim 28, characterized in that the portion with hollow cross section and the portion with solid cross section each have longitudinal axes that are inclined with respect to one another.

35. A crank arm according to claim 28, which has a predetermined useful length between the centres of the areas for connection of the bottom bracket spindle and for connection of the pedal and a predetermined length of said solid portion, characterized in that the ratio between said length of the solid portion and said useful length of the crank arm is equal to or greater than 0.2.

36. A crank arm according to claim 35, which has a predetermined useful length between the centres of the areas for connection of the bottom bracket spindle and for connection of the pedal and a predetermined length of said solid portion, characterized in that the ratio between said length of the solid portion and said useful length of the crank arm is equal to or smaller than 0.5.

37. A crank arm according to claim 28, which has a predetermined useful length between the centres of the areas for connection of the bottom bracket spindle and for connection of the pedal and a predetermined length of said solid portion, characterized in that the ratio between said length of the solid portion and said useful length of the crank arm is comprised between 0.3 and 0.4.

38. A crank arm according to claim 28, which has a predetermined useful length between the centres of the areas for connection of the bottom bracket spindle and for connection of the pedal and a predetermined length of said hollow portion, characterized in that the ratio between said length of the hollow portion and said useful length of the crank arm is equal to or greater than 0.3.

39. A crank arm according to claim 28, which has a predetermined useful length between the centres of the areas for connection of the bottom bracket spindle and for connection of the pedal and a predetermined length of said hollow portion, characterized in that the ratio between said length of the hollow portion and said useful length of the crank arm is equal to or smaller than 0.8.

40. A crank arm according to claim 28, which has a predetermined useful length between the centres of the areas for connection of the bottom bracket spindle and for connection of the pedal and a predetermined length of said hollow portion, characterized in that the ratio between said length of the hollow portion and said useful length of the crank arm is comprised between 0.6 and 0.7.

41. A crank arm according to claim 28, characterized in that the ratio between said first thickness and said second thickness is equal to or greater than 1.2.

42. A crank arm according to claim 28, characterized in that the ratio between said first thickness and said second thickness is equal to or smaller than 3.0.

43. A crank arm according to claim 28, characterized in that the ratio between said first thickness and said second thickness is comprised between 1.5 and 1.7.

44. A crank arm according to claim 28, characterized in that said portion with hollow cross section has walls having a predetermined thickness and in that the ratio between said wall thickness and the thickness of said portion with hollow cross section is equal to or greater than 0.1.

45. A crank arm according to claim 28, characterized in that said portion with hollow cross section has walls having a predetermined thickness and in that the ratio between said wall thickness and the thickness of said portion with cross section is equal to or smaller than 0.3.

46. A crank arm according to claim 28, characterized in that said portion with hollow cross section has walls having a predetermined thickness and in that the ratio between said wall thickness and the thickness of said portion with hollow cross section is substantially equal to 0.2.

47. A crank arm according to claim 28, characterized in that it is made of a material chosen in the group consisting of: aluminium and its alloys, titanium, and structural-fiber-based fabric embedded in a matrix of plastic material, in which said fibres are chosen from the group consisting of; carbon fibres, glass fibres, araniidic fibres, boron fibres, ceramic fibres, and any combination thereof.

48. A crank arm according to claim 28, characterized in that it comprises, between the aforesaid end areas, a second portion with solid cross section.

49. A crank arm according to claim 28, characterized in that the aforesaid cavity has a blind bottom.

50. A crank arm according to claim 28, characterized in that it comprises a pair of holes for connection of the bottom bracket spindle and of the pedal, in which the aforesaid hales do not communicate with the aforesaid cavity.

51. A crank arm according to claim 28, characterized in that the aforesaid area for connection of the pedal is formed in a solid portion having a longitudinal axis substantially aligned to the longitudinal axis of the aforesaid cavity.

52. A crank arm according to claim 28, characterized in that the aforesaid area for connection of the pedal is formed in a solid portion having a longitudinal axis inclined with respect to the longitudinal axis of the aforesaid cavity.

53. A crank arm for a bicycle comprising an elongated body at the ends of which are formed, respectively, an area for connection to the bottom bracket spindle and an area for connection of the pedal, wherein the Crank arm comprises a blind hole located therein, wherein an opening for said hole is located between the areas for connection, wherein the crank arm has a first thickness at said hole and a second different thickness at an area located between the areas for connection.

54. A crank arm for a bicycle comprising a body of predetermined length having a first end configured for connection to a bottom bracket spindle, a second end configured for connection with a pedal, and an intermediate portion extending between the first and second ends wherein:
   the intermediate portion defines solid cross-sectioned portions located on either side of a cavity of a predetermined length, said cavity having an opening that opens out onto an outside of the crank arm in a location between the solid cross-sectioned portions; and
   wherein the ratio between the predetermined length of the cavity to the predetermined length of the body is equal to or greater than 0.2.

* * * * *

UNITED STATES PATENT AND TRADEMARK OFFICE
CERTIFICATE OF CORRECTION

PATENT NO. : 7,258,040 B2  Page 1 of 1
APPLICATION NO. : 10/391705
DATED : August 21, 2007
INVENTOR(S) : Maurizio Valle et al.

It is certified that error appears in the above-identified patent and that said Letters Patent is hereby corrected as shown below:

IN THE SPECIFICATION
In Column 1, Line 44, delete "hallow" and insert --hollow--.

IN THE CLAIMS
In Column 5, Line 66, in Claim 1, delete "positions" and insert --positions--.
In Column 7, Line 36, in Claim 23, delete "of;" and insert --of:--.
In Column 9, Line 33, in Claim 47, delete "of;" and insert --of:--.
In Column 9, Line 34, in Claim 47, delete "araniidic" and insert --aramidic--.
In Column 10, Line 3, in Claim 50, delete "hales" and insert --holes--.
In Column 10, Line 17, in Claim 53, delete "Crank" and insert --crank--.

Signed and Sealed this

Fourth Day of December, 2007

JON W. DUDAS
*Director of the United States Patent and Trademark Office*